Patented Jan. 17, 1933

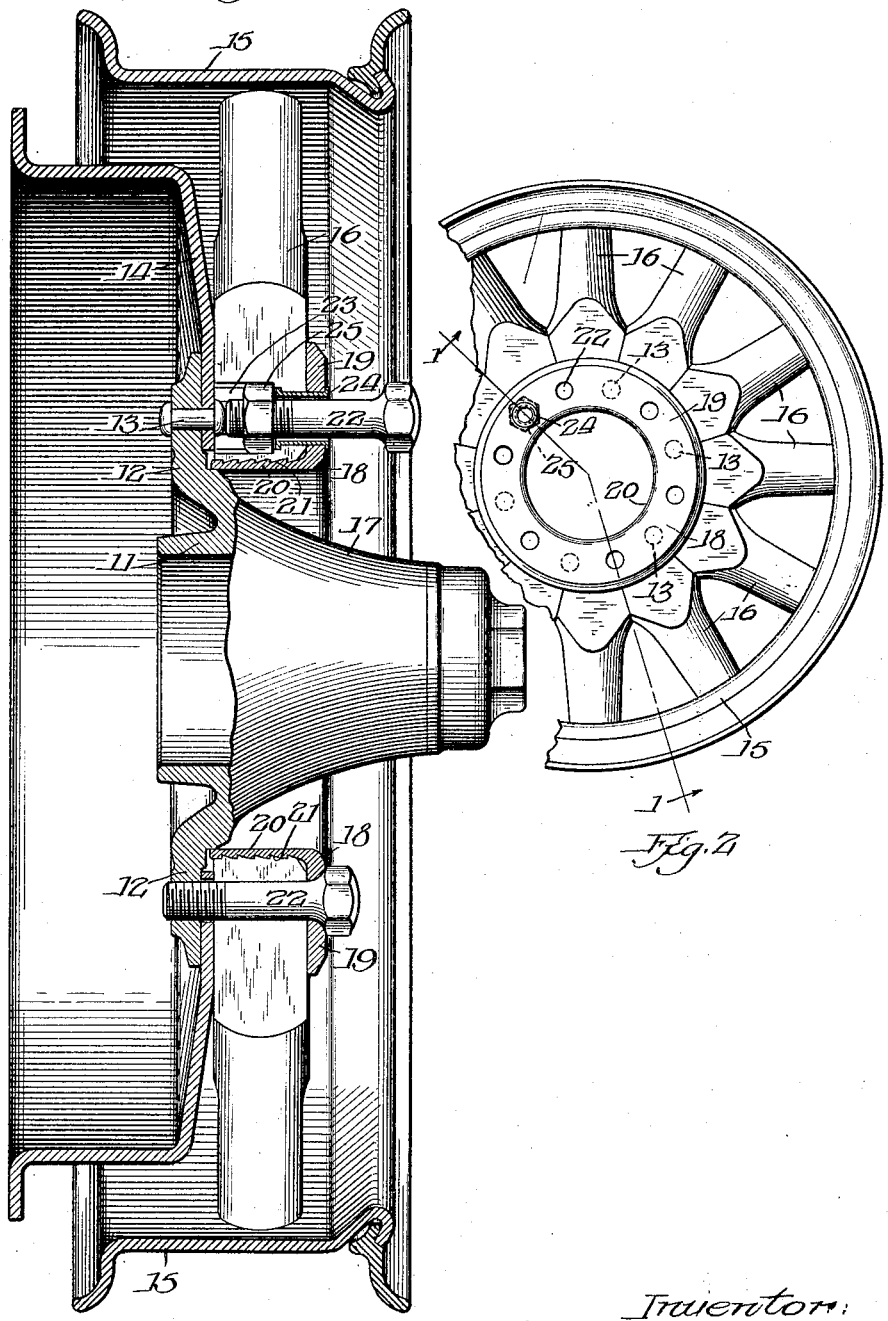

1,894,287

UNITED STATES PATENT OFFICE

ANDREW S. VAN HALTEREN, OF EAST LANSING, MICHIGAN, ASSIGNOR TO MOTOR WHEEL CORPORATION, OF LANSING, MICHIGAN, A CORPORATION OF MICHIGAN

WHEEL DEMOUNTING MEANS

Application filed February 26, 1931. Serial No. 518,306.

The present invention has to do with means for facilitating the disassembly from the hub of demountable wheels, and for assuring the integrity of the wheel elements when disassembled from the hub.

After a demountable wheel has been in service for some time and it becomes necessary to remove the same from the hub in case of injury to the tire or for other reason, it is not infrequently found that the wheel body and hub flange have stuck together by reason of the varnish or paint and considerable difficulty is experienced in breaking this bond. A primary object of the present invention is the provision of means whereby this bond can readily be broken and the wheel loosened.

It is also necessary in connection with spoke wheels, particularly those of wood, to provide means for holding the spokes against disassociation when the wheel is removed from the hub. It is common to provide about the central opening of the wheel body a metal liner of channel section, the two legs of which embrace the sides of the spider and the base of which forms an abutment for the inner ends of the spokes. An object of the present invention is to effect an equivalent binding together of the spider elements with a decrease in weight and manufacturing expense of the channeled liner by doing away with one of the radial legs of the same.

In order that the invention may be readily understood one preferred embodiment of the same is illustrated in the accompanying drawing and set forth in the following description predicated thereon. In the drawing Fig. 1 is an angular section through a demountable wheel assembly taken on the line 1—1 of Fig. 2; and Fig. 2 is a fragmentary front elevation on a reduced scale of a wheel embodying the invention.

Referring to the drawing by way of illustration only, there is shown a hub 11 provided with the usual hub flange 12 to which flange is riveted at 13 a brake drum 14. Upon the hub flange 12 is mounted a wheel body comprising the rim 15 and the spoke elements 16. About the central opening for the accommodation of the hub barrel 17 is arranged an annular liner 18 of L-section, one leg 19 of which lies against the forward face of the spoke spider made up of the elements 16, while the other leg 20 of the liner forms an inner abutment for the spoke ends. The leg 20 of the liner, for a purpose more fully to be explained, has its outer contact face formed with forwardly inclined serrations or teeth 21.

The leg 19 of the liner and the spoke spider are provided with an annular series of bolt holes adapted to receive cap screws 22 or other forms of bolts which extend into threaded engagement with the hub flange, whereby the wheel body is mounted upon or demounted from the hub. These cap screws 22 for removable clamping of the wheel to the hub flange preferably alternate with the rivets 13 for permanently securing the brake drum to the hub flange, although it is to be understood that in some cases the brake drum and rivets might be omitted or the brake drum applied to the opposite side of the hub flange without in any way affecting the present invention inasmuch as the hub flange forms the rear carrying support and attaching medium for the wheel body.

At some point intermediate the holes in the spoke spider for the cap screws 22 there is provided a hole 23 which extends through the wheel spider from its front to the front face of the rear support, which hole may have its forward portion lined by a thimble 24. Driven into this hole 23 from the rear is a nut 25, the corners of which are forced into engagement with the wood to prevent turning therein and further movement towards the front prevented by the reduced section of the hole here shown as provided with the thimble 24. This nut has an interior thread corresponding to that of the cap screws 22.

Assuming that in the act of demounting this wheel from its hub, all of the cap screws 22 having been removed and it being discovered that the wheel body is stuck to the hub flange so that it cannot readily be lifted off, one of the cap screws 22 is then entered into the hole 23 and screwed into the nut 25 until the rear end of the bolt engages the hub flange 12 or the brake drum 14 or the rivet 13 or whatever portion of the fixed support is in line with the cap screw. Further turning of the cap screw 22, acting through the nut 25, will force the spider and related parts away from the hub flange. The breaking of the bond at this one point will result, as is well known, with the breaking of the bond throughout and thus enable the wheel to be lifted from the hub.

Where the liner 18 about the central wheel opening is of channel section, with a leg lying both in front of and at the rear of the spoke ends, the integrity of the spider is not impaired by removing the cap screws 22 used to assemble the wheel body with the hub, but where for purposes of lightness and economy one of the legs of the channel is omitted, substitute means of some sort must be employed to prevent the spokes from shifting laterally out of the embrace of the liner. Many expedients have been resorted to for this purpose, all of which possess some disadvantage.

According to my invention I provide the outer face of the inner liner leg 20 with serrations or teeth inclined towards the front leg 19. When the liner annulus is forced into the central opening of the spider from the front, these serrations bite into the ends of the wood spokes and the interengagement prevents any reverse movement of the liner out of the spider or of individual spokes away from the liner.

It is also a known fact in wood wheel manufacture that the miters of the spokes settle after the wheel has been placed in use and the butt ends of the spokes pattern into the hub. The contact between the spoke ends and the hub or liner is found to be much tighter after use than at the time of assembly. This provision of serrations on the liner further takes advantage of this condition, as they bite deeper into the spoke ends under conditions of use.

I claim:

A demountable wheel assembly including a fixed rear support for the wheel, the support provided in the hub zone with threaded apertures, the wheel provided with an equal number of unthreaded apertures in alignment with the threaded apertures of the support, a corresponding number of headed mounting bolts with threaded shanks extending freely through the wheel apertures into threaded engagement with the apertures of the support, the wheel also provided with an additional aperture closed at the rear by the support, and a nut imbedded in the last mentioned aperture fixed against axial and angular movement and threaded to fit the mounting bolts.

In testimony whereof I have hereunto subscribed my name.

ANDREW S. VAN HALTEREN.